US011332077B2

(12) United States Patent
Liu et al.

(10) Patent No.: US 11,332,077 B2
(45) Date of Patent: May 17, 2022

(54) GLOVEBOX

(71) Applicant: Ford Global Technologies, LLC, Dearborn, MI (US)

(72) Inventors: Frank Qiukui Liu, Canton, MI (US); Glenn Biddinger, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 341 days.

(21) Appl. No.: 16/747,127

(22) Filed: Jan. 20, 2020

(65) Prior Publication Data

US 2021/0221296 A1 Jul. 22, 2021

(51) Int. Cl.
*B60R 7/06* (2006.01)
*B60R 21/205* (2011.01)
*B60R 11/00* (2006.01)

(52) U.S. Cl.
CPC .............. *B60R 7/06* (2013.01); *B60R 21/205* (2013.01); *B60R 2011/0005* (2013.01); *B60R 2011/0094* (2013.01)

(58) Field of Classification Search
CPC .............. B60R 7/06; B60R 2011/0005; B60R 2011/0094; B60R 21/205
USPC ..................................................... 296/37.12
See application file for complete search history.

(56) References Cited

U.S. PATENT DOCUMENTS

| 5,971,461 | A | 10/1999 | Vaishnav et al. | |
|---|---|---|---|---|
| 7,152,898 | B2 | 12/2006 | Augustyniak | |
| 7,416,212 | B2 * | 8/2008 | Iwasaki | B60R 21/045 280/751 |
| 2012/0112488 | A1 * | 5/2012 | Iwamoto | B60R 7/06 296/37.12 |
| 2016/0075298 | A1 * | 3/2016 | Ozawa | B60R 7/06 280/752 |
| 2019/0092246 | A1 * | 3/2019 | Yamazaki | B60R 7/06 |
| 2019/0193640 | A1 * | 6/2019 | Liu | B60R 7/06 |
| 2019/0323274 | A1 * | 10/2019 | Vemulapati | E05D 3/02 |
| 2019/0337459 | A1 | 11/2019 | Liu et al. | |

FOREIGN PATENT DOCUMENTS

| DE | 102004025034 | * | 12/2005 | ............... B60R 7/06 |
|---|---|---|---|---|
| DE | 102016212809 | * | 6/2018 | ............... B60R 7/06 |
| JP | 2019206275 A | | 12/2019 | |
| KR | 101614134 B1 | | 4/2016 | |

* cited by examiner

*Primary Examiner* — Gregory A Blankenship
(74) *Attorney, Agent, or Firm* — Vichit Chea; Price Heneveld LLP

(57) ABSTRACT

A vehicle includes a housing disposed within a dashboard, a bin rotationally operable within the housing, and a hook integral to the bin and positionable around a post assembly integral to the housing, wherein the hook is operable between a design position when the bin is in a closed position, an open position when the bin is in a fully ajar position, and an assembly position when the bin is in an installation position.

15 Claims, 15 Drawing Sheets

GLOVEBOX

FIELD OF THE DISCLOSURE

The present disclosure generally relates to storage containers disposed within a passenger cabin of a vehicle and more specifically, a glovebox having an attachment assembly for attaching and detaching a glovebox bin from a housing.

BACKGROUND OF THE DISCLOSURE

Vehicles may include interior storage compartments, such as a glovebox mounted within a dashboard of a vehicle. These compartments may be rotationally operable from within the dashboard so that a user may access and close the compartment as needed.

SUMMARY OF THE DISCLOSURE

According to one aspect of the present disclosure, a vehicle includes a housing disposed within a dashboard, a bin rotationally operable with the housing, and a hook integral to the bin and positionable around a post assembly integral to the housing, wherein the hook is operable between a design position when the bin is in a closed position, an open position when the bin is in a fully ajar position, and an assembly position when the bin is in an installation position.

Embodiments of the first aspect of the disclosure can include any one or a combination of the following features:
  the post assembly includes a post and a retainer disposed away from the post such that a gap is created between the post and the retainer;
  the post includes a semi-circular surface and a flat portion;
  the flat portion is disposed between a first portion of the semi-circular surface and a second portion of the semi-circular surface;
  the retainer includes a retainer engagement surface;
  the hook includes an exterior hook engagement surface;
  when the hook is in the design position, the exterior hook engagement surface is fully engaged along the length of the retainer engagement surface;
  when the hook is in the open position, the exterior hook engagement surface is engaged with approximately 90% of the length of the retainer engagement surface;
  when the hook is in the assembly position, the exterior hook engagement surface and the retainer engagement surface are disengaged;
  the exterior hook engagement surface includes a cam-type spline surface;
  the exterior hook engagement surface and the retainer engagement surface form an interference fit to reduce noise otherwise generated by contact between the exterior hook engagement surface and the retainer engagement surface;
  the bin is rotatable about an axis offset from the axis of rotation defined by the post in the range of approximately 50.0° to approximately 80.0° from the installation position to the closed position; and
  an airbag disposed below the glovebox.

According to another aspect of the present disclosure, a vehicle glovebox includes a bin rotationally operable within a housing, a post assembly coupled to the housing that includes a post and a retainer, and a hook extending from the bin and engageable with the post assembly that includes an interior hook engagement surface and an exterior hook engagement surface, wherein the interior hook engagement surface and the exterior hook engagement surface are engaged with the post and the retainer when the hook is in a design position, and the interior hook engagement surface and the exterior hook engagement surface are engaged with the post and the retainer when the hook is in an open position.

Embodiments of the second aspect of the disclosure can include any one or a combination of the following features:
  the interior hook engagement surface is engaged with the post of the post assembly when the hook is in an assembly position, and wherein the exterior hook engagement surface is disengaged with the retainer of the post assembly when the hook is in the assembly position; and
  the bin includes a recess proximate the interior hook engagement surface in a bottom portion of the bin and configured to substantially eliminate a sink mark on an A-surface of the bottom portion of the bin.

According to a further aspect of the present disclosure, a method for rotatably coupling a glovebox bin, including an outward extending hook to a glovebox housing including a post assembly includes the steps of positioning an interior hook engagement surface of the hook around a post of the post assembly, rotating the hook around the post in a first direction until an exterior hook engagement surface of the hook partially engages a retainer engagement surface of a retainer of the post assembly, and rotating the hook around the post in the first direction until an exterior hook engagement surface of the hook fully engages a retainer engagement surface of a retainer of the post assembly to create an interference fit between the exterior hook engagement surface and the retainer engagement surface.

Embodiments of the third aspect of the disclosure can include any one or a combination of the following features:
  the step of rotating the hook around the post until an exterior hook engagement surface of the hook partially engages a retainer engagement surface of a retainer of the post assembly further includes the step of rotating the hook around the post until the exterior hook engagement surface of the hook is engaged with approximately 90% of the length of the retainer engagement surface of the retainer of the post assembly;
  the steps further include rotating the hook around the post in a second direction until an exterior hook engagement surface of the hook partially engages a retainer engagement surface of a retainer of the post assembly, rotating the hook around the post in the second direction until an exterior hook engagement surface of the hook disengages from the retainer engagement surface of the post assembly, and removing the glovebox bin from the glovebox housing; and
  the step of creating an interference fit between the exterior hook engagement surface and the retainer engagement surface includes the step of positioning the hook around the post such that a first semi-circular portion of the post and a second semi-circular portion of the post engage with the hook such that a space is disposed between the interior hook engagement surface and a flat portion of the post disposed between the first semi-circular portion of the post and the second semi-circular portion of the post.

These and other aspects, objects, and features of the present disclosure will be understood and appreciated by those skilled in the art upon studying the following specification, claims, and appended drawings.

DETAILED DESCRIPTION

Figure 1:
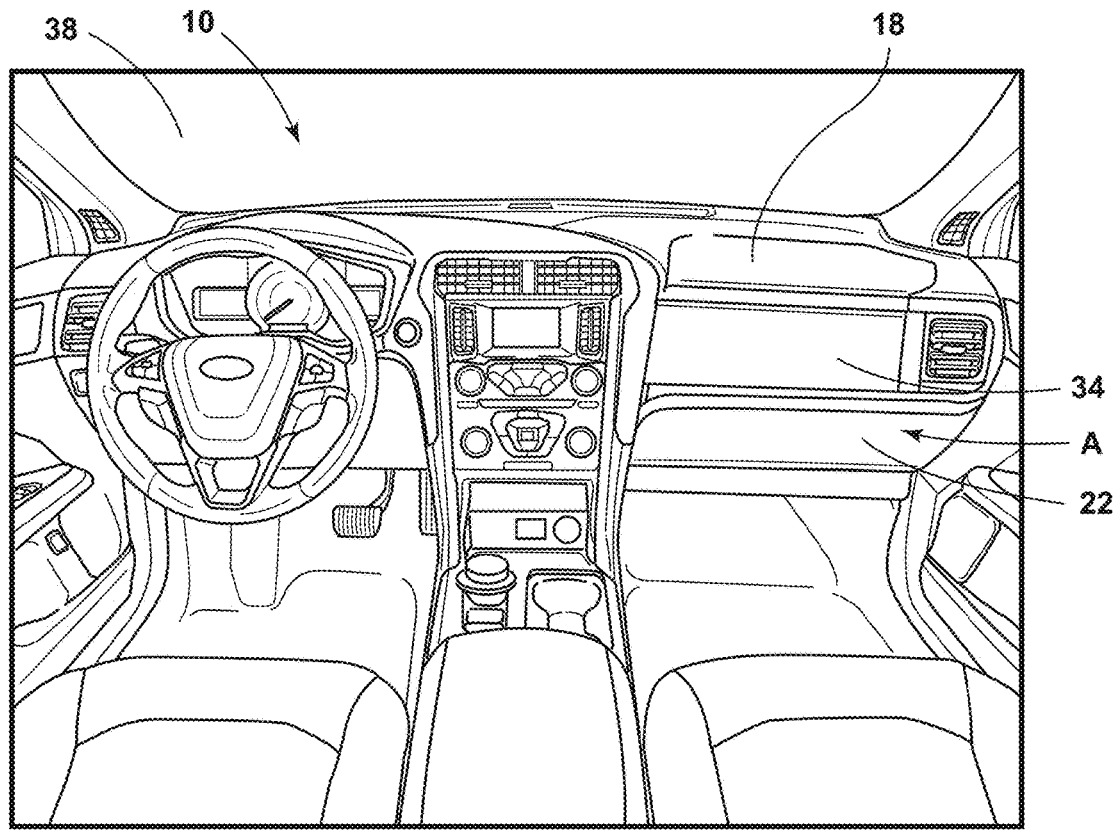
FIG. 1 is a perspective view of a dashboard disposed within a passenger compartment of a vehicle and showing the glovebox bin in the closed position, according to an embodiment.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary aspects of the inventive concepts defined in the appended claims. Hence, specific dimensions and other physical characteristics relating to the aspects disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As required, detailed aspects of the present disclosure are disclosed herein; however, it is to be understood that the disclosed aspects are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Referring to FIGS. 1-16, a vehicle 10 includes a housing (for example, glovebox frame 14) disposed within a dashboard 18 and a bin (for example, glovebox bin 22) rotationally operable within the housing (for example, glovebox frame 14). A hook 26 integral to the bin (for example, glovebox bin 22) is positionable around a post assembly 30 integral to the housing (for example, glovebox frame 14). The hook 26 is operable between a design position a when the bin (for example, glovebox bin 22) is in a closed position A, an open position b when the bin (for example, glovebox bin 22) is in the fully ajar position B, and an assembly position c when the bin (for example, glovebox bin 22) is in an installation position C.

Figure 2:
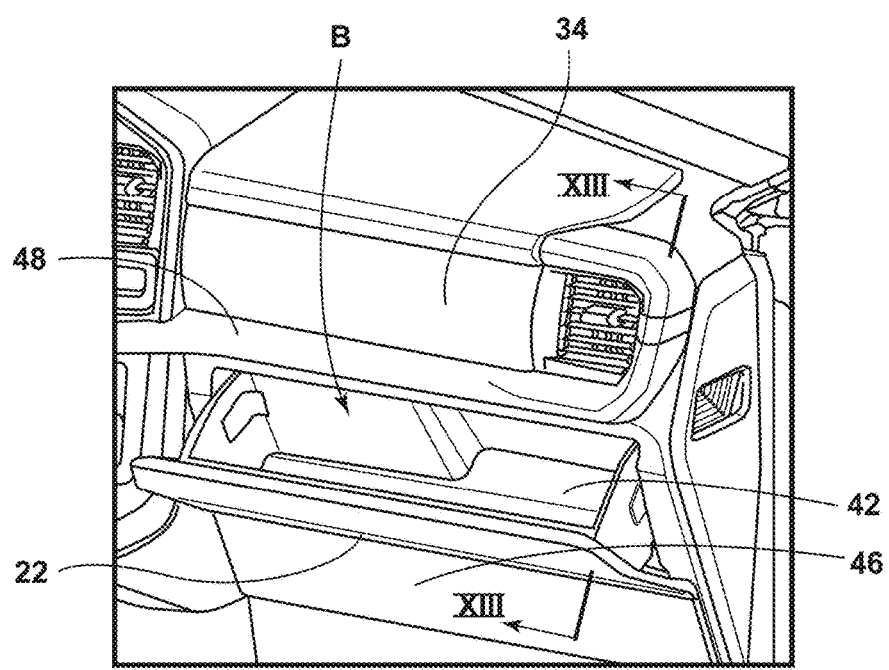
FIG. 2 is a perspective view of the glovebox disposed within a passenger compartment of the vehicle and showing the glovebox bin in the fully ajar position, according to an embodiment.
Figure 3:
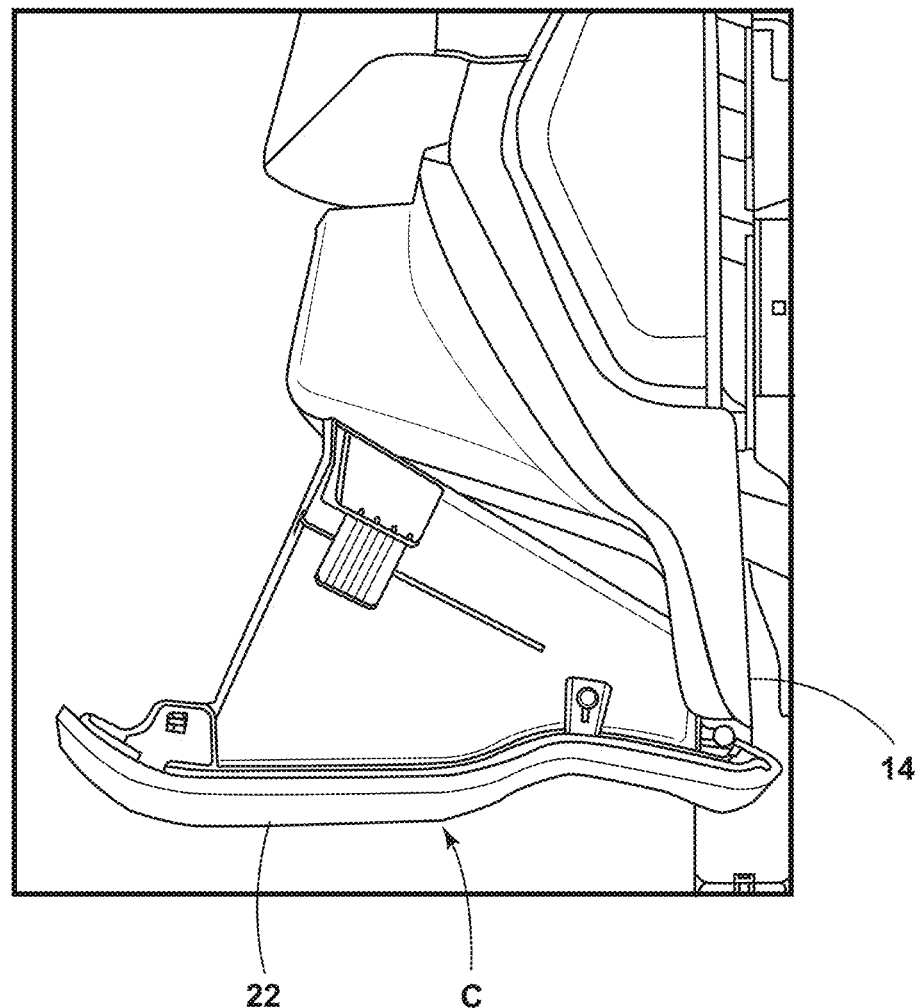
FIG. 3 is a left side elevational view of the glovebox disposed within a passenger compartment of the vehicle and showing the glovebox bin in an installation position, according to an embodiment.

Referring to FIGS. 1-3, a glovebox 34 may be disposed within a dashboard 18 set within a front area of the passenger compartment 38 of a vehicle 10. The glovebox 34 may include a glovebox bin 22 that may be rotationally operable within a housing. The housing may include the glovebox frame 14. See, FIG. 5. The housing may be integral with the instrument panel 174. See, FIG. 13. The glovebox bin 22 may include a glovebox bin interior 42 that may be used for storing various items within the dashboard 18 of the vehicle 10. The glovebox bin 22 may be positionable in at least a closed position A (FIG. 1), a fully ajar position B (FIG. 2), and an installation position C (FIG. 3). An airbag 46 may be disposed below the glovebox 34. The airbag 46 may be a PKAB (Passenger-side Knee Air Bag). An airbag cover 178 (FIG. 13) may be disposed over the airbag 46. The dashboard 18 may include trim 48. The trim 48 may be disposed over the instrument panel 174. See, FIG. 13.

An operator may desire space in the instrument panel 174 for rotational coupling of the glovebox bin 22 to a post assembly 30 extending from the housing. In the example shown in FIGS. 4 and 5, the glovebox bin 22 may include hooks 26 disposed along a bottom portion 50 of the glovebox bin 22. The hooks 26 may be designed to engage with the post assembly 30 in the space provided for the glovebox hinge assembly 54 (FIG. 11) above the airbag 46. The glovebox hinge assembly 54 may include a hook 26 disposed in a post assembly 30. An axis of rotation 58 (FIGS.

7-11) may extend through the hinge assembly 54. The axis of rotation 58 may extend through the hook 26.

Figure 4:
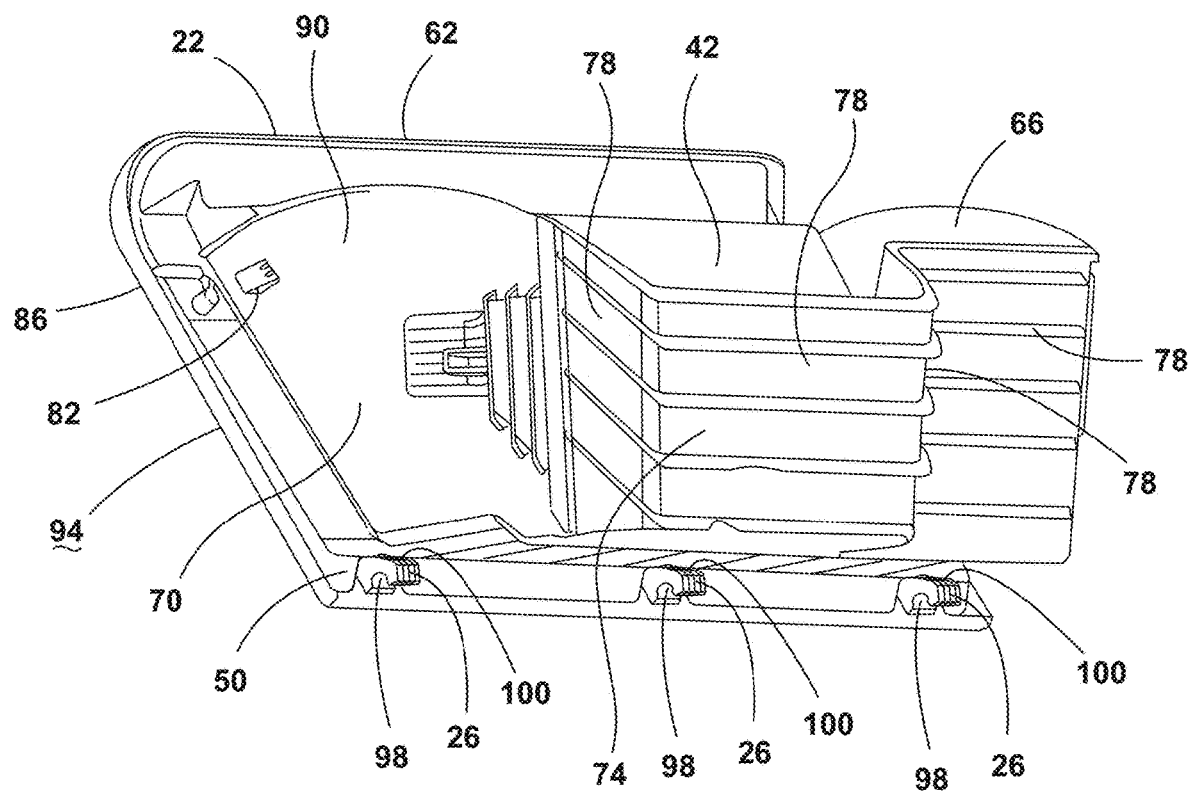
FIG. 4 is a back perspective view of a glovebox bin, according to an embodiment.

Referring to FIG. 4, a back perspective view of the glovebox bin 22 is shown. The glovebox bin 22 may include an interior 42, a front wall 62, sidewalls 66, 70, and a rear wall 74. The rear wall 74 may include several panels 78 that may be arranged to fit within available space in the instrument panel 174. Downstops 82 may be disposed on the outsides of the sidewalls 66, 70. The glovebox bin 22 may include one or more materials. In the example shown, the glovebox bin 22 may include a substrate portion 86 with integral hooks 26 that may be molded over the container portion 90. The substrate portion 86 may form the A-surface 94 of the glovebox bin 22. The A-surface 94 of the glovebox bin 22 may face the vehicle interior 42. Each of the three hooks 26 may include an interior hook engagement surface 98 and an exterior hook engagement surface 100.

With reference to FIGS. 4 and 7-11, the interior hook engagement surface 98 may be designed to engage with a post 102 of the post assembly 30. The exterior hook engagement surface 100 may be designed to engage with a retainer 106 of the post assembly 30. Each of the hooks 26 may be proximate a recess 110. The recess 110 may be created during the glovebox bin 22 molding process to minimize the likelihood of a sink mark on the A-surface 94 of the of substrate portion 86 of the glovebox bin 22. The recess 110 may extend along the bottom portion 50 of the glovebox bin 22. As such, the glovebox bin 22 may be rotatably coupled to the glovebox frame 14.

Figure 5:
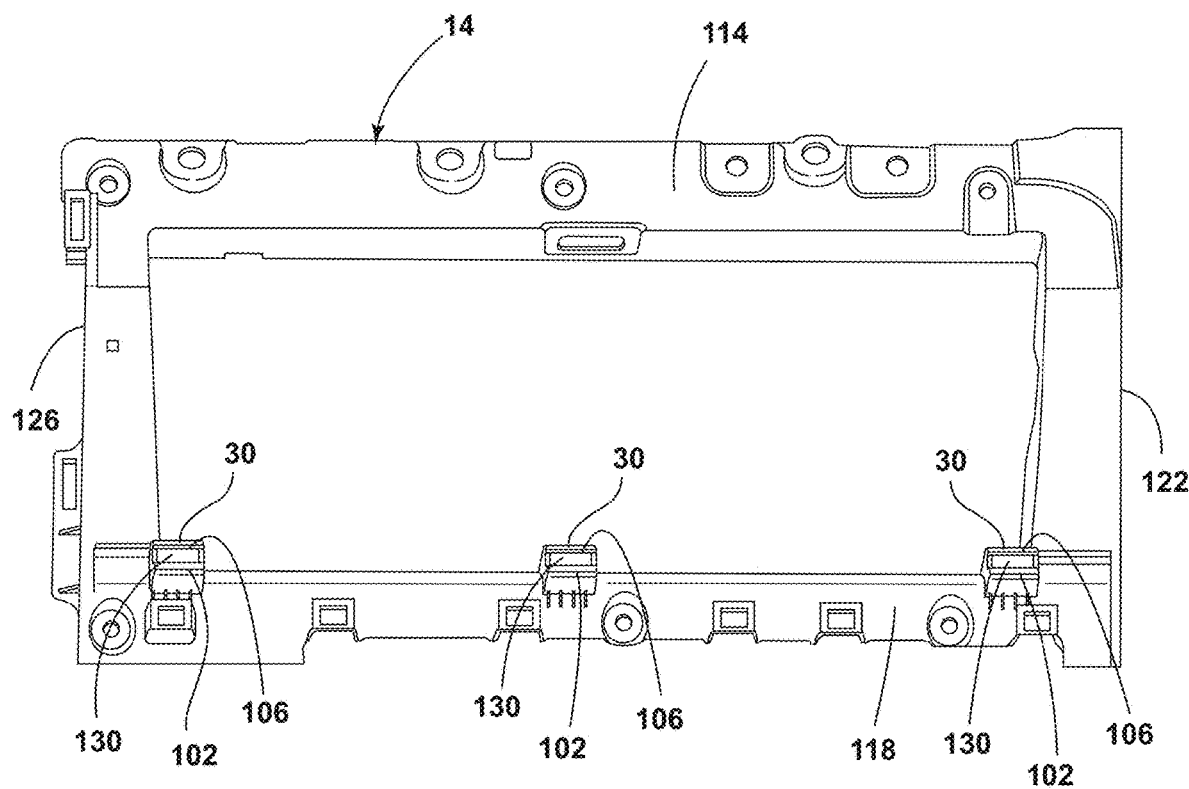
FIG. 5 is a front elevational view of a glovebox frame, according to an embodiment.

Referring to FIG. 5, a front perspective view of the glovebox frame 14 is shown. The glovebox frame 14 may be secured to the instrument panel 174. The glovebox frame 14 may be referred to as the glovebox surround. The glovebox frame 14 may include a top segment 114, a bottom segment 118, and opposing side segments 122, 126. The bottom segment 118 may include three post assemblies 30 for receiving the three hooks 26 disposed on the glovebox bin 22. The glovebox frame 14 may be molded. The post assemblies 30 may be molded as part of the glovebox frame 14. Each post assembly 30 may include a post 102 and a retainer 106. The retainer 106 may be disposed away from the post 102 such that a gap 130 may be created between the post 102 and the retainer 106. Holes may be disposed on the top segment 114 and the bottom segment 118 of the glovebox frame 14. The holes may receive fasteners for mounting the glovebox frame 14 to the instrument panel 174. Slots may be disposed on the bottom segment 118 of the glovebox frame 14. The slots may receive fasteners for mounting the glovebox frame 14 to the instrument panel 174.

Figure 6:
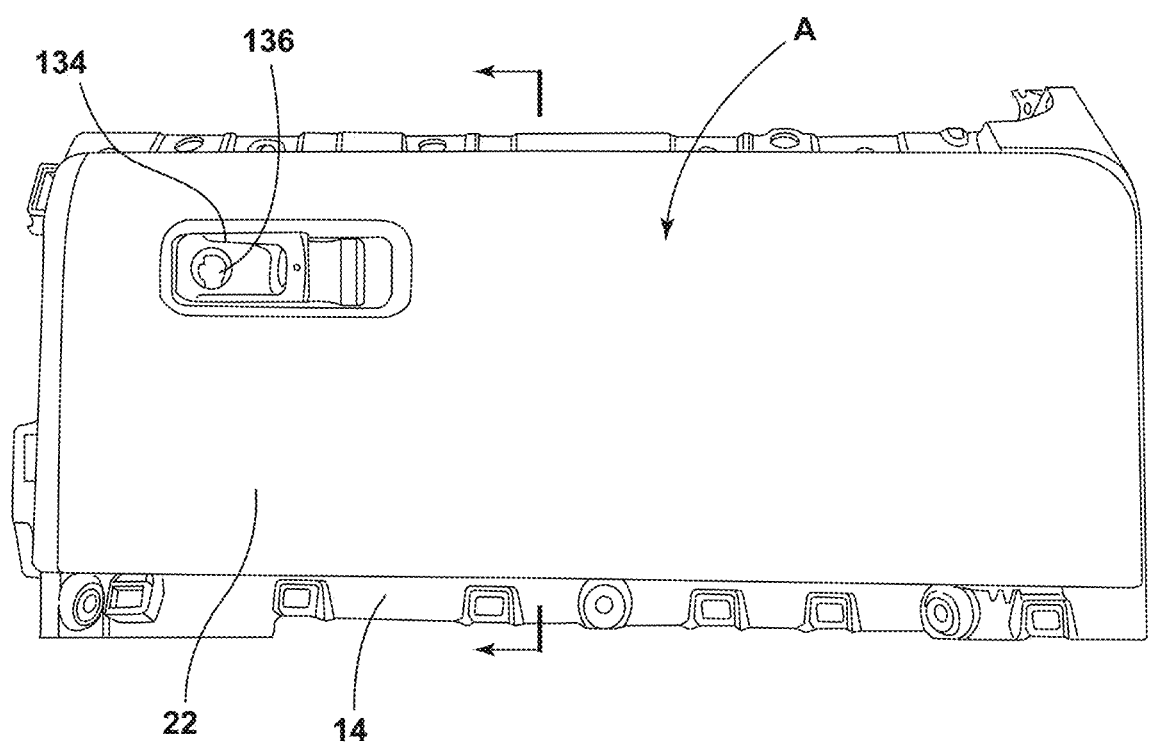
FIG. 6 is a front elevational view of a glovebox bin in a closed position and a glovebox frame, according to an embodiment.

Referring now to FIG. 6, a front of a glovebox bin 22 is shown. The glovebox bin 22 is shown in the closed position A. The glovebox bin 22 is shown disposed over a glovebox frame 14. An actuator 134 is shown disposed on the glovebox bin 22. The actuator 134 may be activated to unlatch a latch to move the glovebox bin 22 from a closed position A to a fully ajar position B. The actuator 134 may include a lock 136 for receiving a key.

Figure 7:
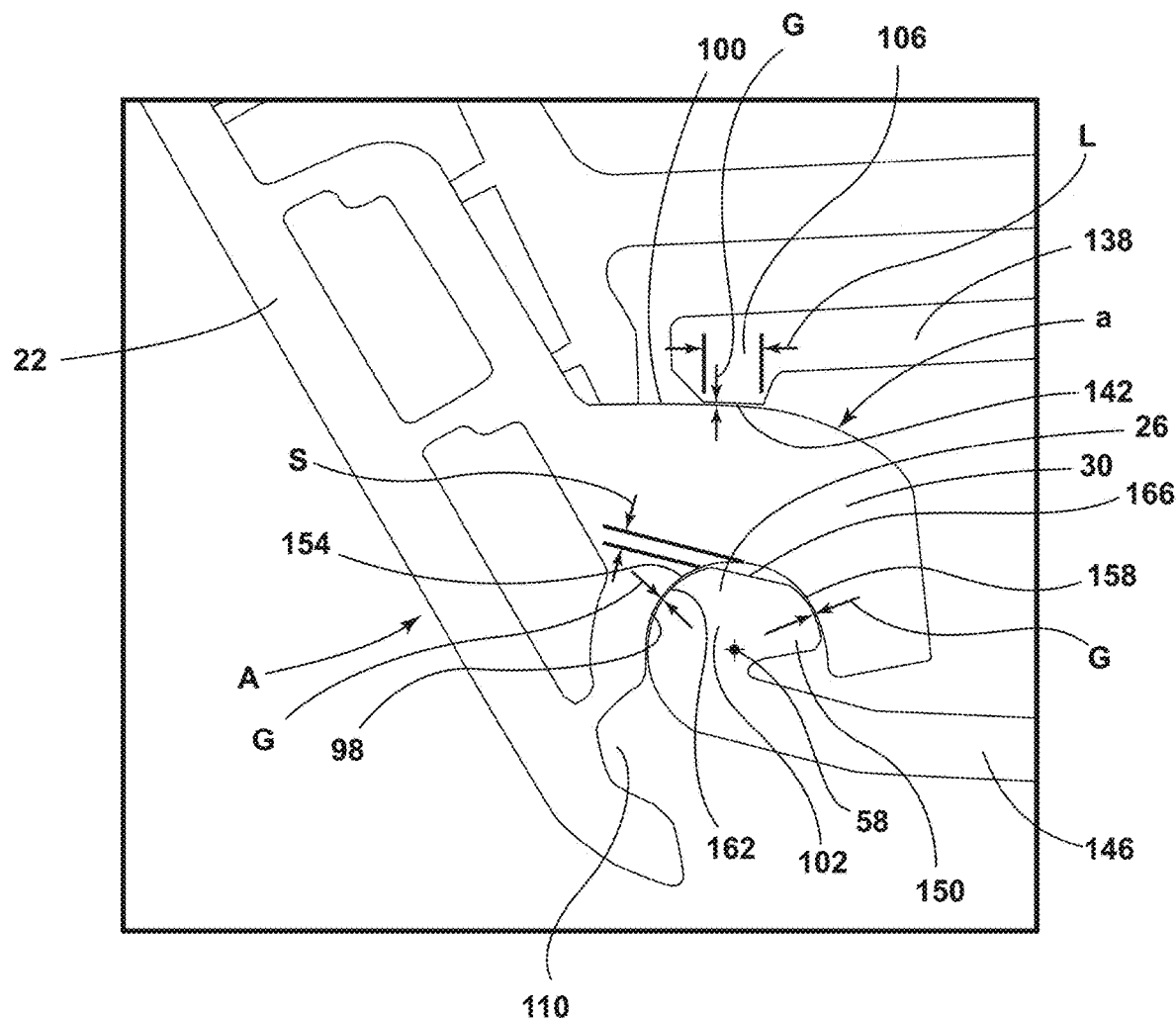
FIG. 7 is a cross-sectional view of a glovebox bin in a closed position and a glovebox frame taken along VII-VII of FIG. 6.
Figure 8:
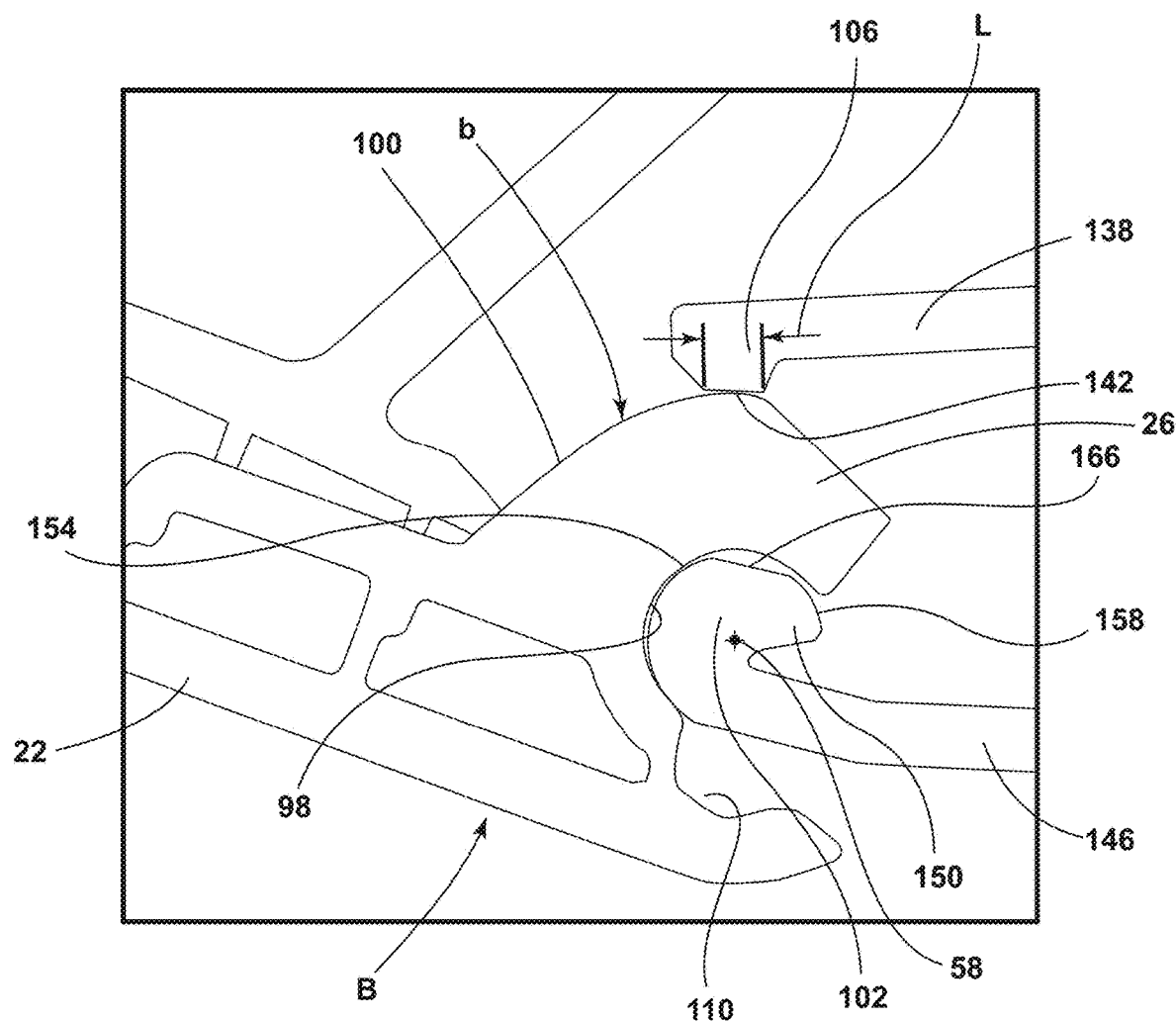
FIG. 8 is a cross-sectional view of the glovebox bin and the glovebox frame of FIG. 7 with the glovebox bin in the fully ajar position.
Figure 9:
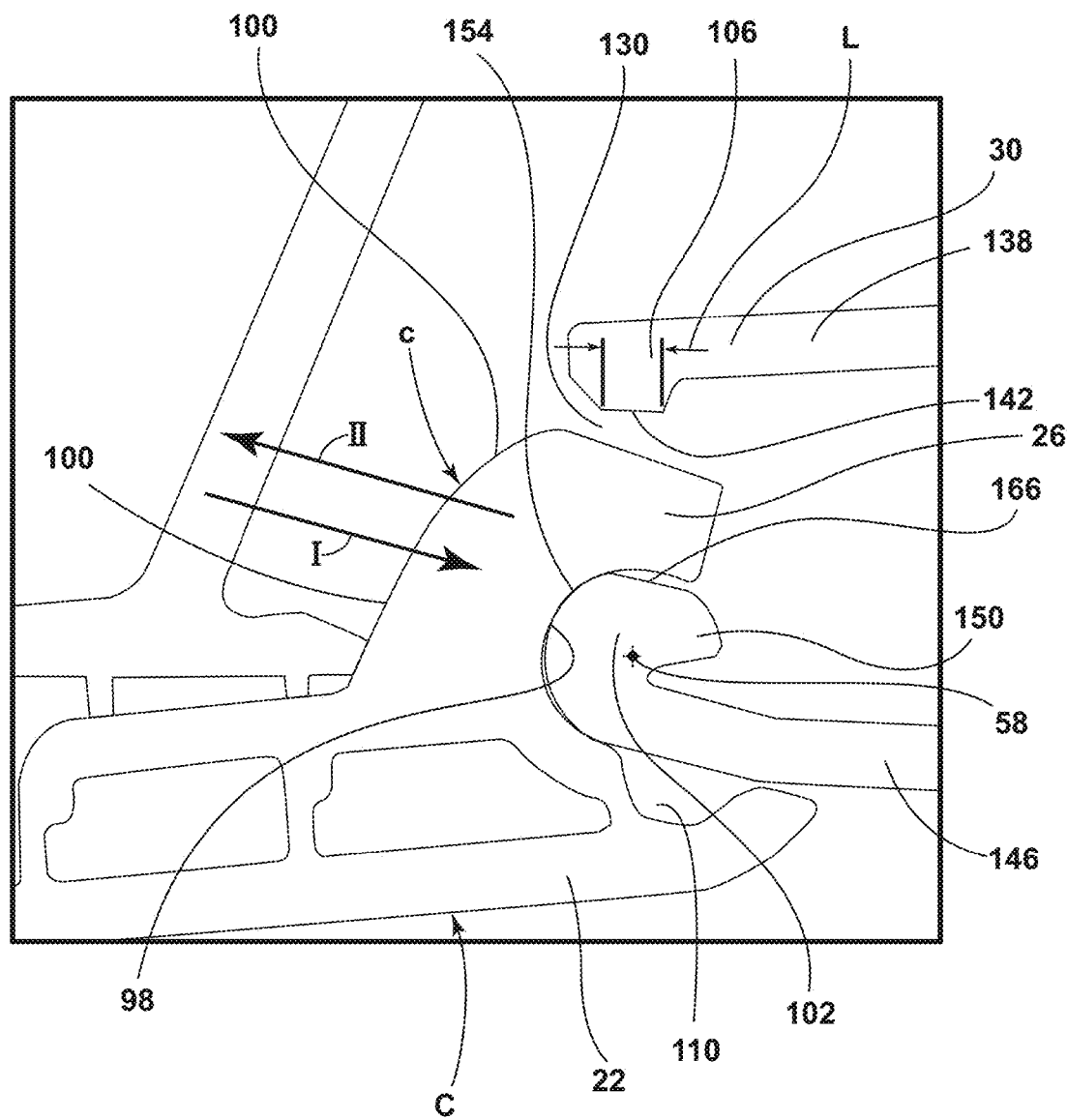
FIG. 9 is a cross-sectional view of the glovebox bin and the glovebox frame of FIG. 7 with the glovebox bin in the installation position.

Referring to FIGS. 7-9, the glovebox bin 22 is shown in the closed position A (FIG. 7), the fully ajar position B (FIG. 8), and the installation position C (FIG. 9). Referring to FIG. 7, when the glovebox bin 22 is in the closed position A, the hook 26 is in the design position a. The hook 26 is shown engaged with the post assembly 30. The retainer 106 and the post 102 may extend from a glovebox frame 14. In other examples, the retainer 106 and the post 102 may extend from a housing disposed in or integral to an instrument panel 174 or other structure. The retainer 106 may include an elongated member 138 having an end that includes a retainer engagement surface 142. The post 102 may include an elongated member 146 having a bulbous portion 150 extending from an end of the elongated member 146. The bulbous portion 150 may include a substantially semi-circular outer surface. In the example shown, the post 102 may include substantially semi-circular outer portions 158, 162 disposed on either side of a flat portion 166. The hook 26 may include an interior hook engagement surface 98 and an exterior hook engagement surface 100. In the example shown, the interior hook engagement surface 98 may include a semi-circular portion. The semi-circular portion of the interior hook engagement surface 98 may span about 180.0°. A recess 110 may be disposed adjacent to the semi-circular interior hook engagement surface 98. When the glovebox bin 22 is in the closed position A, the hook 26 is in the design position a. When the hook 26 is in the design position a, the exterior hook engagement surface 100 is fully engaged with the retainer engagement surface 142. When the hook 26 is in the design position a, the semi-circular outer portion 158 of the post 102 and the semi-circular outer portion 162 of the post 102 are both engaged with the interior hook engagement surface 98. In the example shown, gaps G may be present between the retainer engagement surface 142 and the exterior hook engagement surface 100, the interior hook engagement surface 98 and the semi-circular outer portion 158 of the post 102, and the interior hook engagement surface 98 and the semi-circular outer portion 162 of the post 102. The gaps G may be present to accommodate manufacturing variations. The gaps G may be in the exemplary range of approximately 0.05 millimeters to approximately 0.2 millimeters, and ideally less than approximately 0.1 millimeters. An embodiment of the disclosure (FIG. 15) with a varied exterior hook engagement surface 100 may also utilized.

With continued reference to FIGS. 7-9, a space S may exist between the flat portion 166 of the post 102 and the interior hook engagement surface 98 when the hook 26 is in the design position a and the glovebox bin 22 is in the corresponding closed position A.

Referring now to FIG. 8, the glovebox bin 22 is shown in the fully ajar position B and the hook 26 is shown in the open position b. When the hook 26 is in the open position b, the exterior hook engagement surface 100 may be engaged with between approximately 45% and approximately 99%, and ideally approximately 90%, of a length L of the retainer engagement surface 142.

Referring now to FIG. 9, the glovebox bin 22 is shown in the installation position C. When the glovebox bin 22 is in the installation position C, then the hook 26 is in the assembly position c. When the hook 26 is in the assembly position c, the exterior hook engagement surface 100 and the retainer engagement surface 142 may be disengaged. As such, the glovebox bin 22 may be positioned with the hook 26 in contact with the post 102 by moving the glovebox bin 22 in the direction shown by arrow I. The glovebox bin 22 may be rotated around the axis of rotation 58 to move the glovebox bin 22 from the installation position C to the fully ajar position B or the closed position A. To disengage the glovebox bin 22 from the post assembly 30, the glovebox bin 22 may be moved from the closed position A or the fully ajar position B to the installation position C. When the glovebox bin 22 is in the installation position C, the glovebox bin 22 may be moved away from the post assembly 30 in the direction shown by arrow II. As such, the gap 130 between the retainer 106 and the post 102, in combination with the shape of the hook 26, allow for the glovebox bin 22, in the installation position C, to be disengaged from the post assembly 30 by moving the glovebox bin 22 in the direction shown by arrow II.

Figure 10:
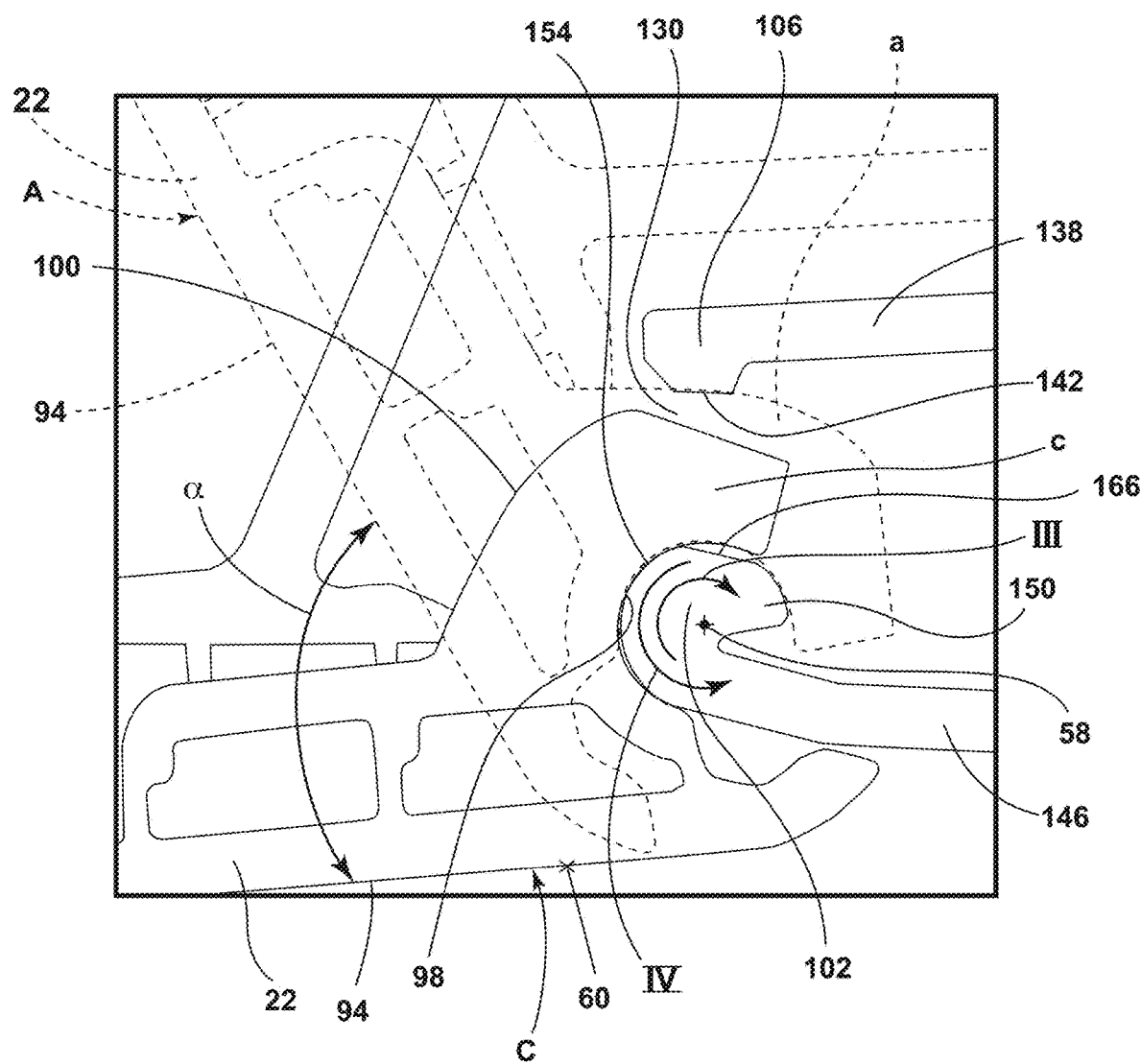
FIG. 10 is a cross-sectional view of a hook and a post assembly of a respective glovebox bin and a glovebox frame with the glovebox bin in an installation position and a closed position, according to an embodiment.

Referring now to FIG. 10, the glovebox bin 22 is shown in an installation position C and a closed position A. The A-surface 94 of the glovebox bin 22 may be displaced a rotational distance a around an offset axis 60 as the hook 26 rotates around the post 102. The rotational distance a may be between approximately 50.0° and approximately 80.0°, and ideally approximately 65.0°, when the glovebox bin 22 moves from the installation position C to the closed position A in the direction shown by arrow III or from the closed position A to the installation position C in the direction shown by arrow IV.

Figure 11:
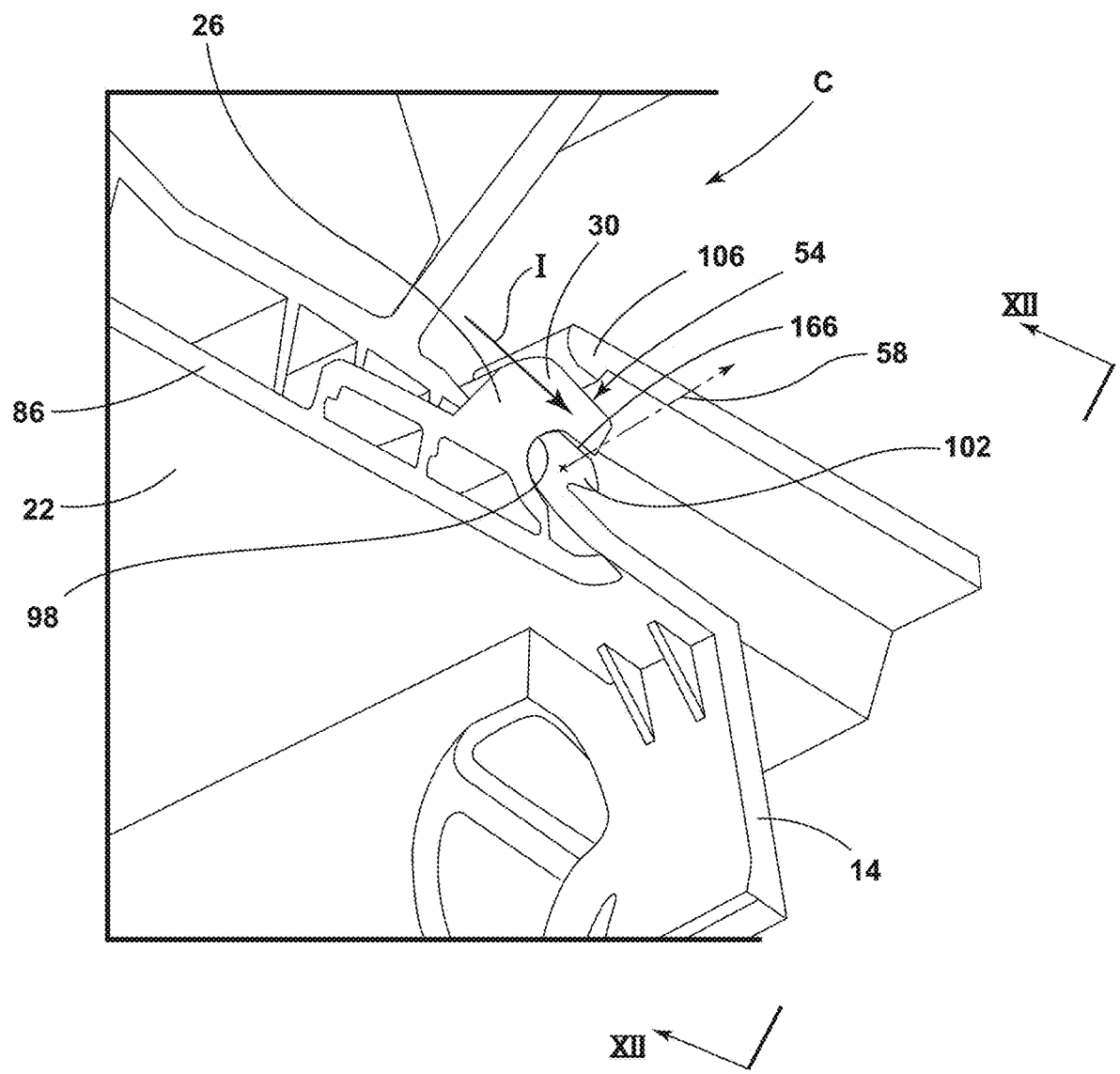
FIG. 11 is a perspective view of a hook of a glovebox bin and a post assembly of a glovebox frame with the glovebox bin in the installation position, according to an embodiment.

Referring now to FIG. 11, a side perspective view is shown of a portion of the hook 26 and a portion of the post assembly 30. The post assembly 30 may extend from the glovebox frame 14. The hook 26 may extend from the substrate portion 86 of the glovebox bin 22. The glovebox bin 22 is shown in the installation position C, and the hook 26 is shown in the corresponding assembly position c. The operator may move the glovebox bin 22 into the installation position C in the direction shown by arrow I so that the hook 26 of the glovebox bin 22 is rotatably coupled to the post 102 to form a glovebox hinge assembly 54.

Referring to FIGS. 7-11, an operator may position the glovebox bin 22 such that the exterior hook engagement surface 100 does not engage with the retainer engagement surface 142 as the hook 26 passes through the gap 130 disposed between the post 102 and the retainer 106. The hook 26 may pass through the gap 130 disposed between the hook 26 and the retainer 106 in the direction shown by arrow I until the hook 26 contacts the post 102. After the hook 26 contacts the post 102, the glovebox bin 22 may be rotated in the direction shown by arrow III until the glovebox bin 22 is in the fully ajar position B and the hook 26 is in the corresponding open position b. The exterior hook engagement surface 100 may be engaged with between approximately 45% and approximately 99%, and ideally approximately 90%, of a length L of the retainer engagement surface 142 when the glovebox bin 22 is in the fully ajar position B and the hook 26 is in the corresponding open position b. The engagement of approximately 45% to approximately 99%, and ideally approximately 90%, of a length L of the retainer engagement surface 142 with the exterior hook engagement surface 100 may maintain the glovebox 34 in a fully ajar position B. In addition to the engagement of approximately 45% to approximately 99%, and ideally approximately 90%, of a length L of the retainer engagement surface 142 with the exterior hook engagement surface 100, other mechanical features such as glovebox downstops 82 or support straps extending between the glovebox bin 22 and a housing may also maintain the glovebox bin 22 in the fully ajar position B.

Figure 12:
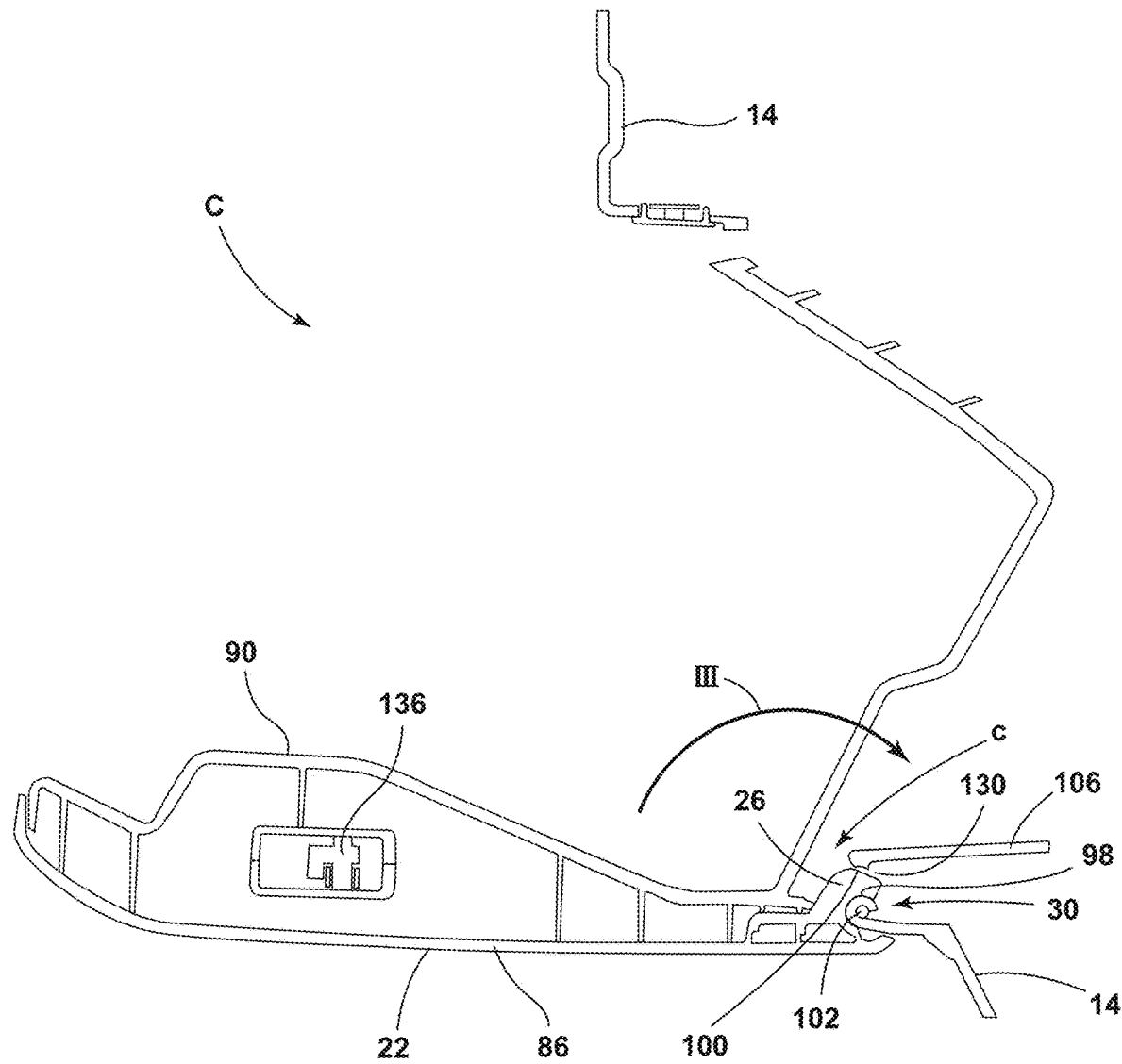
FIG. 12 is a cross-sectional view of a glovebox bin in an installation position and a glovebox frame taken along XII-XII of FIG. 11.

Referring now to FIG. 12, a cross-sectional view of the glovebox bin 22 and the glovebox frame 14 of FIG. 11 is shown when the glovebox 34 in is in the installation position C. The glovebox bin 22 may include the container portion 90 and the substrate portion 86. A lock 136 for receiving a key is shown disposed in the glovebox bin 22. When the hook 26 is in the assembly position c, the interior hook engagement surface 98 may be engaged with the post 102 of the post assembly 30. When the hook 26 is in the assembly position c, the exterior hook engagement surface 100 is disengaged with the retainer 106 of the post assembly 30.

Figure 13:
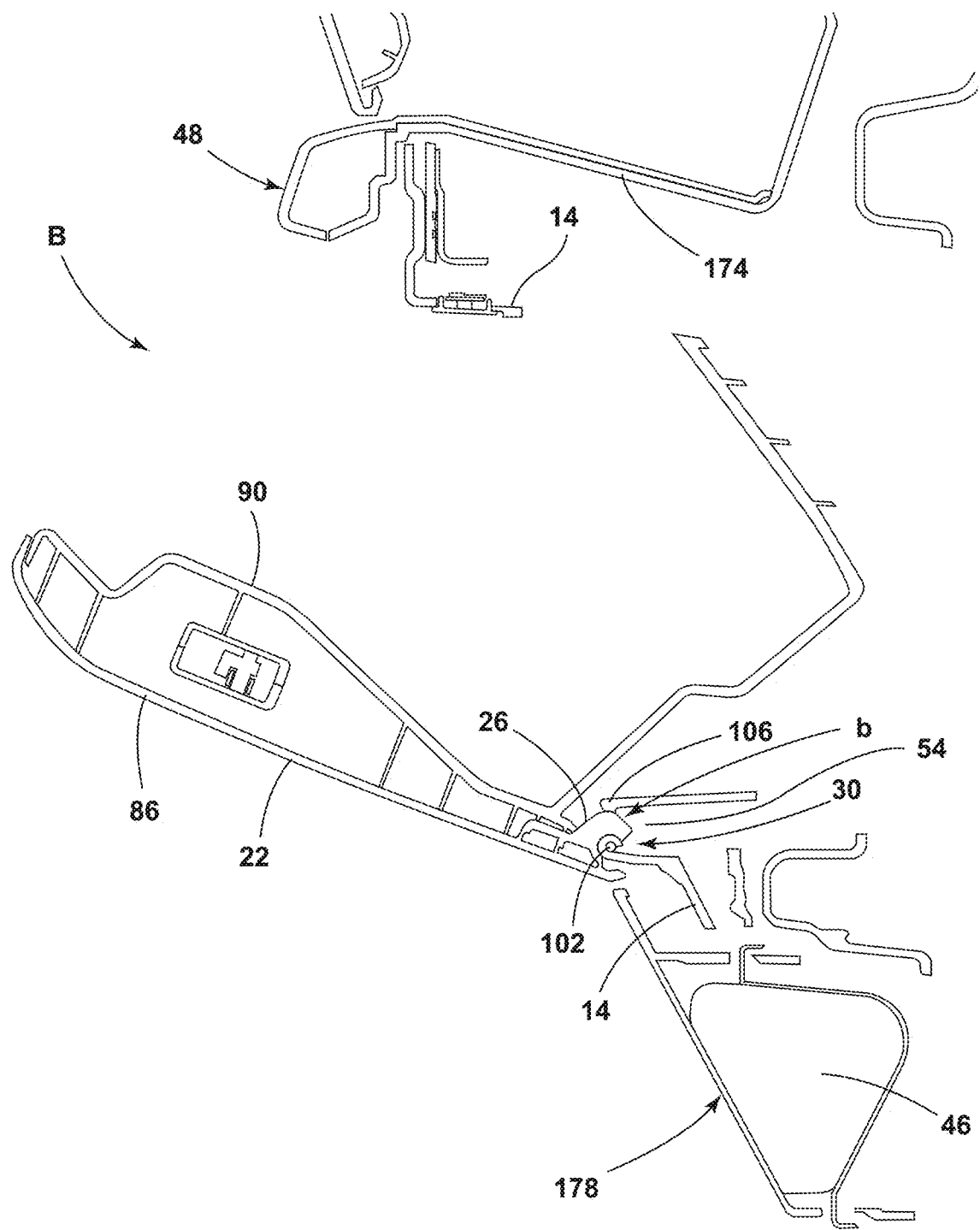
FIG. 13 is a cross-sectional view of a glovebox bin in a fully ajar position and a glovebox frame disposed within an instrument panel taken along XIII-XIII of FIG. 2.

Referring now to FIG. 13, a cross-sectional view taken along XIII-XIII of FIG. 2 is shown of the glovebox bin 22, the glovebox frame 14, and the instrument panel 174. The glovebox bin 22 is shown in the fully ajar position B, and the hook 26 is in the corresponding open position b. The glovebox bin 22 includes the container portion 90 and the substrate portion 86. The post assembly 30 includes the retainer 106 and the post 102. The airbag cover 178 is shown disposed below the glovebox hinge assembly 54. Trim 48 may be disposed over the instrument panel 174.

Figure 14:
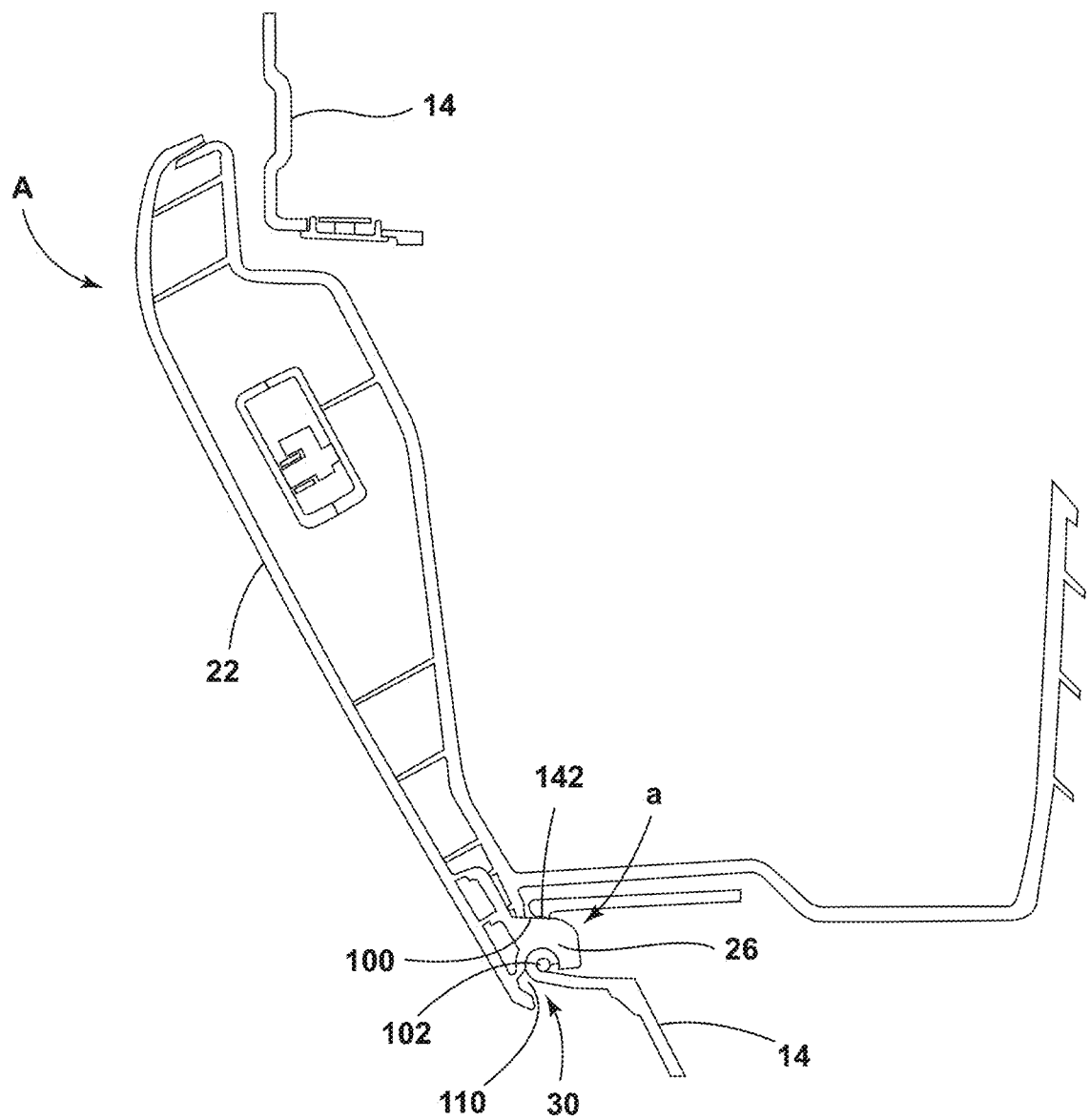
FIG. 14 is a cross-sectional view of a glovebox bin of FIG. 12 in a closed position and a glovebox frame.

Referring to FIG. 14, a cross-sectional view is shown of the glovebox bin 22 in the closed position A. The hook 26 may be in the design position a when the glovebox bin 22 is in the closed position A. The exterior hook engagement surface 100 may be fully engaged with the retainer engagement surface 142.

Figure 15:
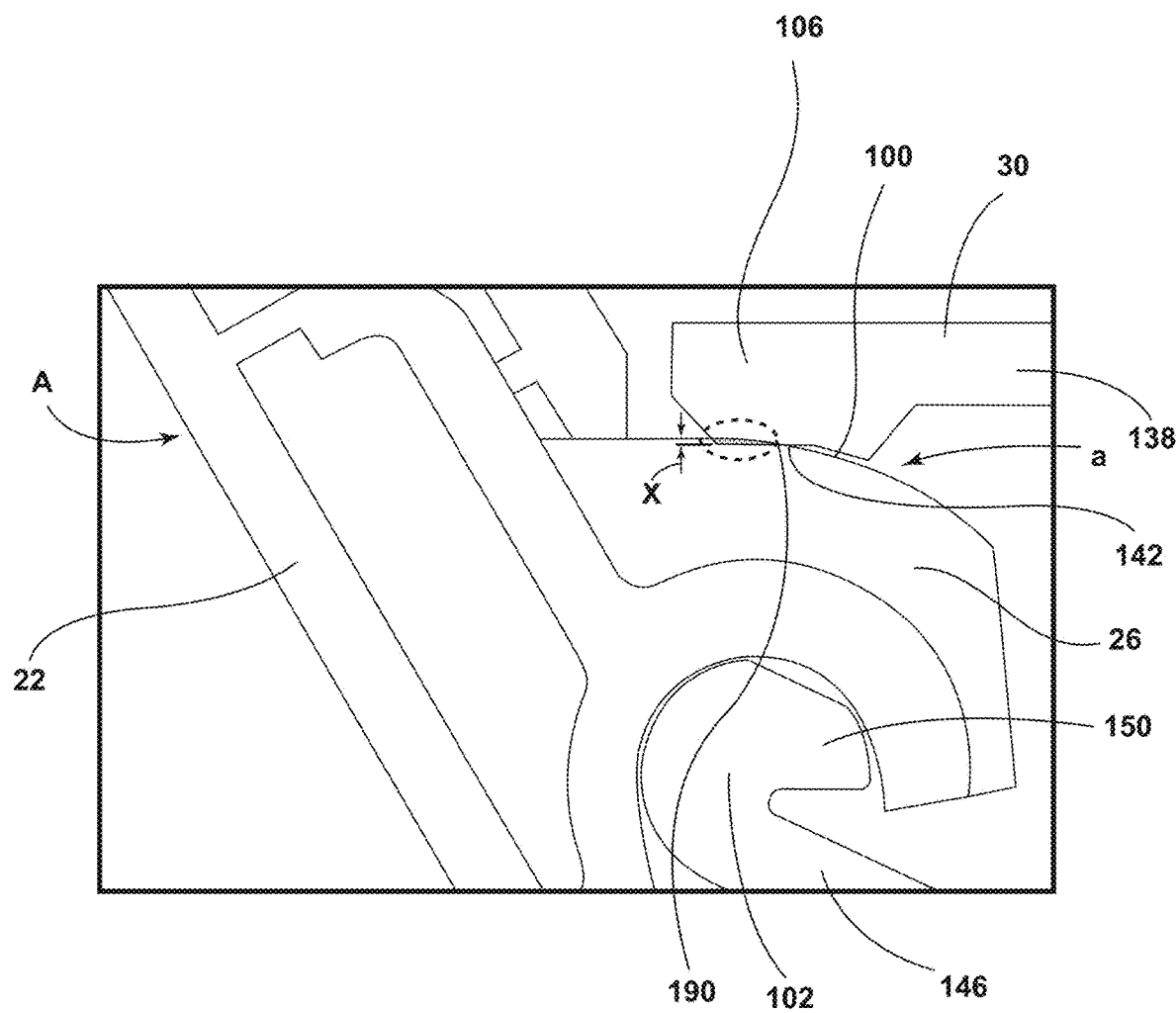
FIG. 15 is a cross-sectional view of a post assembly and a hook in the design position, according to an embodiment.

Referring to FIG. 15, a cross-sectional view is shown of an embodiment of the glovebox bin 22 in the closed position A and the hook 26 in the design position a. In the example shown, the exterior hook engagement surface 100 includes a cam-type spline surface 190. The cam-type spline surface 190 may be designed to result in an interference X between the retainer engagement surface 142 and the exterior hook engagement surface 100. When the glovebox bin 22 is rotated from the fully ajar position B to the closed position A, then the hook 26 moves from the open position b to the design position a. An interference X may be in place during the final approximately 5.0° to approximately 15.0°, and ideally approximately 10.0°, of rotation of the glovebox bin 22 around the offset axis 60 from the fully ajar position B to the closed position A. The interference X may include a distance in the exemplary range of approximately 1.0 millimeter to approximately 3.0 millimeters, and ideally approximately 2.0 millimeters. The materials of the hook 26, the retainer 106, and the post 102 may have characteristics that may allow an interference X to be present between the exterior hook engagement surface 100 and the retainer engagement surface 142. The interference X may minimize any potential positional looseness of the glovebox bin 22 within the glovebox frame 14, housing, instrument panel 174, and/or other structural component. Minimization of any potential positional looseness between the glovebox bin 22 and the glovebox frame 14, the housing, the instrument panel 174, and/or other structural component in the vehicle 10 may minimize the likelihood of rattles or noise during operation of the vehicle 10.

Figure 16:
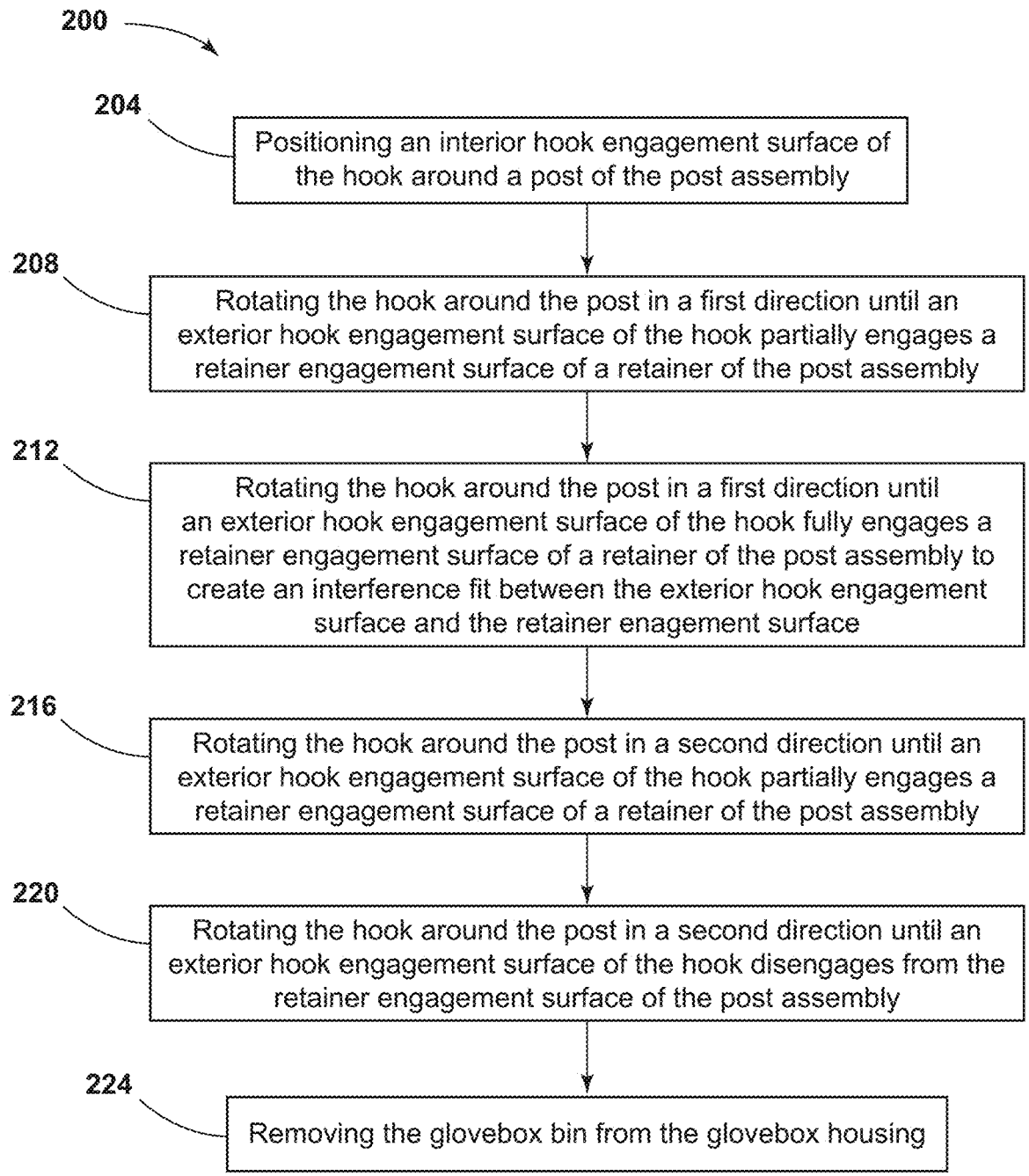
FIG. 16 is a flow diagram of a method for rotatably coupling a glovebox bin including an outward extending hook to a glovebox housing including a post assembly, according to an embodiment.

Referring to FIG. 16, a method 200 for rotatably coupling a glovebox bin 22 including an outward extending hook 26 to a housing including a post assembly 30 may include several steps. Step 204 may include positioning an interior hook engagement surface 98 of the hook 26 around a post 102 of the post assembly 30. Step 208 may include rotating the hook 26 around the post 102 in a first direction (arrow III) until an exterior hook engagement surface 100 of the hook 26 partially engages a retainer engagement surface 142 of a retainer 106 of the post assembly 30. Step 212 may include rotating the hook 26 around the post 102 in the first direction (arrow III) until an exterior hook engagement surface 100 of the hook 26 fully engages a retainer engagement surface 142 of a retainer 106 of the post assembly 30 to create an interference fit between the exterior hook engagement surface 100 and the retainer engagement surface 142. Step 216 may include rotating the hook 26 around the post 102 in a second direction (arrow IV) until an exterior hook engagement surface 100 of the hook 26 partially engages a retainer engagement surface 142 of a retainer 106 of the post assembly 30. Step 220 may include the step of rotating the hook 26 around the post 102 in the second direction (arrow IV) until an exterior hook engagement surface 100 of the hook 26 disengages from the retainer engagement surface 142 of the post assembly 30. Step 224 may include the step of removing the glovebox bin 22 from the housing.

As such, aspects of the method 200 may be used during the vehicle assembly process. With reference to FIGS. 7-13 and 16, during the vehicle assembly process, an operator may position the glovebox bin 22 around the post assembly 30 in the installation position C. The operator may rotate the glovebox bin 22 around the post 102 from an installation position C to a closed position A. The glovebox bin 22 may remain in the design position a during the remainder of the vehicle assembly process. In one exemplary additional step of the vehicle assembly process, the glovebox bin 22 may be rotated from the closed position A to the installation position C. When the glovebox bin 22 is in the installation position C, an operator may remove the glovebox bin 22 from the instrument panel 174 so that wires or other components may be inserted into the instrument panel space behind the glovebox bin 22. After the operator inserts the wires or other components into the instrument panel space behind the glovebox bin 22, the operator may place the glovebox bin 22 in the installation position C and rotate the glovebox bin 22 from the installation position C to the closed position A. The vehicle assembly process may resume with the wires or other components present in the instrument panel space behind the glovebox bin 22. As such, the hook 26 and the post assembly 30 arrangement may provide convenient installation of and removal of the glovebox bin 22 during the vehicle assembly process.

It is to be understood that the present disclosure may be utilized in a vehicle glovebox 34 and other storage containers disposed in a vehicle.

A variety of advantages may be obtained by use of the present disclosure. A hook 26 coupled to the glovebox bin 22 may engage with the post assembly 30 when the glovebox bin 22 is in a closed position A, a fully ajar position B, and an installation position C. The glovebox bin 22 may be rotated around a post 102 in the post assembly 30 by a rotational distance a around an offset axis 60 (between approximately 50.0° and approximately 80.0°, and ideally approximately) 65.0° to move from the installation position C to the closed position A. The installation position C (as defined by rotational distance a around an offset axis 60 from a closed position A of the glovebox bin 22 to an installation position C of the glovebox bin 22) may allow glovebox bin 22 installation while an airbag 46 or other device may be positioned below the glovebox 34. Placement of the airbag 46 below the glovebox 34 accommodates vehicle packaging considerations. As such, the design of a hook 26 and a post assembly 30 that may allow a glovebox bin 22 to be installed on the glovebox frame 14 at a predetermined installation position C (rotational distance a around an offset axis 60 from the glovebox bin 22 in the closed position A) in the present example accommodates vehicle packaging considerations. Additionally, an interference between the retainer engagement surface 142 and a cam-type spline surface 190 of an exterior hook engagement surface 100 may provide stability to the glovebox bin 22 within a housing and minimize rattles and noises during vehicle use. Further, a recess 110 disposed along the bottom portion of the glovebox bin 22 may minimize shrink defects on the A-surface 94 of the glovebox bin 22.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:
    a housing disposed within a dashboard;
    a bin rotationally operable within the housing; and
    a hook integral to the bin and positionable around a post assembly integral to the housing, wherein the hook is operable between a design position when the bin is in a closed position, an open position when the bin is in a fully ajar position, and an assembly position when the bin is in an installation position, wherein the post assembly includes a post and a retainer disposed away from the post such that a gap is created between the post and the retainer, wherein the post includes a semi-circular surface and a flat portion, wherein the retainer includes a retainer engagement surface, wherein the hook includes an exterior hook engagement surface, and wherein when the hook is in the design position the exterior hook engagement surface is fully engaged along the length of the retainer engagement surface.

2. The vehicle claim 1, wherein the flat portion is disposed between a first portion of the semi-circular surface and a second portion of the semi-circular surface.

3. The vehicle of claim 1, wherein when the hook is in the open position the exterior hook engagement surface is engaged with approximately 90% of the length of the retainer engagement surface.

4. The vehicle of claim 3, wherein when the hook is in the assembly position the exterior hook engagement surface and the retainer engagement surface are disengaged.

5. The vehicle of claim 4, wherein the exterior hook engagement surface includes a cam-type spline surface.

6. The vehicle of claim 5, wherein the exterior hook engagement surface and the retainer engagement surface form an interference fit to reduce noise otherwise generated by contact between the exterior hook engagement surface and the retainer engagement surface.

7. The vehicle of claim 1, wherein the bin is rotatable about an axis offset from an axis of rotation defined by the post in the range of approximately 50.0° to approximately 80.0° from the installation position to the closed position.

8. The vehicle of claim 6 further comprising:
    an airbag disposed below the glovebox.

9. A vehicle glovebox comprising:
    a bin rotationally operable within a housing;
    a post assembly coupled to the housing and including a post and a retainer; and
    a hook extending from the bin and engageable with the post assembly and including:
    an interior hook engagement surface; and
    an exterior hook engagement surface, wherein the interior hook engagement surface and
    the exterior hook engagement surface are engaged with the post and the retainer when the hook is in a design position and wherein the interior hook engagement surface and the exterior hook engagement surface are engaged with the post and the retainer when the hook is in an open position.

10. The vehicle glovebox of claim 9, wherein the interior hook engagement surface is engaged with the post of the post assembly when the hook is in an assembly position and wherein the exterior hook engagement surface is disengaged with the retainer of the post assembly when the hook is in the assembly position.

11. The vehicle glovebox of claim 10, wherein the bin includes a recess proximate the interior hook engagement surface in a bottom portion of the bin and configured to substantially eliminate a sink mark on an A-surface of the bottom portion of the bin.

12. A method for rotatably coupling a glovebox bin including an outward extending hook to a glovebox housing including a post assembly comprising the steps of:
 positioning an interior hook engagement surface of the hook around a post of the post assembly;
 rotating the hook around the post in a first direction until an exterior hook engagement surface of the hook partially engages a retainer engagement surface of a retainer of the post assembly; and
 rotating the hook around the post in the first direction until an exterior hook engagement surface of the hook fully engages a retainer engagement surface of a retainer of the post assembly to create an interference fit between the exterior hook engagement surface and the retainer engagement surface.

13. The method for rotatably coupling the glovebox bin including the outward extending hook to the glovebox housing including the post assembly of claim 12, wherein the step of rotating the hook around the post until an exterior hook engagement surface of the hook partially engages a retainer engagement surface of a retainer of the post assembly further comprises the step of:
 rotating the hook around the post until the exterior hook engagement surface of the hook is engaged with approximately 90% of the length of the retainer engagement surface of the retainer of the post assembly.

14. The method for rotatably coupling the glovebox bin including the outward extending hook to the glovebox housing including the post assembly of claim 12, further comprising the steps of:
 rotating the hook around the post in a second direction until an exterior hook engagement surface of the hook partially engages a retainer engagement surface of a retainer of the post assembly;
 rotating the hook around the post in the second direction until an exterior hook engagement surface of the hook disengages from the retainer engagement surface of the post assembly; and
 removing the glovebox bin from the glovebox housing.

15. The method for rotatably coupling the glovebox bin including the outward extending hook to the glovebox housing including the post assembly of claim 12, wherein the step of creating an interference fit between the exterior hook engagement surface and the retainer engagement surface includes the step of:
 positioning the hook around the post such that a first semi-circular portion of the post and a second semi-circular portion of the post engage with the hook and such that a space is disposed between the interior hook engagement surface and a flat portion of the post disposed between the first semi-circular portion of the post and the second semi-circular portion of the post.

* * * * *